US012645365B2

(12) United States Patent
Liu

(10) Patent No.: US 12,645,365 B2
(45) Date of Patent: Jun. 2, 2026

(54) MEMORY SYSTEMS AND OPERATION METHODS THEREOF TO IMPROVE WEAR LEVELING OF A MEMORY DEVICE

(71) Applicant: Yangtze Memory Technologies Co., Ltd., Wuhan (CN)

(72) Inventor: Jingsheng Liu, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 396 days.

(21) Appl. No.: 18/148,799

(22) Filed: Dec. 30, 2022

(65) Prior Publication Data

US 2024/0168649 A1    May 23, 2024

(30) Foreign Application Priority Data

Nov. 17, 2022    (CN) .......................... 202211440575.6

(51) Int. Cl.
G06F 3/06    (2006.01)

(52) U.S. Cl.
CPC ............ G06F 3/0616 (2013.01); G06F 3/064 (2013.01); G06F 3/0653 (2013.01); G06F 3/0679 (2013.01)

(58) Field of Classification Search
None
See application file for complete search history.

(56) References Cited

U.S. PATENT DOCUMENTS

| | | | | |
|---|---|---|---|---|
| 2018/0341413 A1* | 11/2018 | Lai | ........................ | G06F 3/0659 |
| 2022/0137840 A1* | 5/2022 | Lee | ....................... | G06F 3/0649 |
| | | | | 711/154 |
| 2023/0343402 A1* | 10/2023 | Bonitz | ................... | G11C 29/42 |

* cited by examiner

*Primary Examiner* — Michael Alsip
(74) *Attorney, Agent, or Firm* — Hanley, Flight & Zimmerman, LLC

(57)    ABSTRACT

Examples of the present disclosure provide a memory system and operation method thereof, a memory device and operation method thereof. In one example, the operation method for the memory system includes: obtaining a wear value of a system area and a wear value of a user area within a first period of time; and determining whether to reallocate virtual blocks in a first reserved area of the system area and a second reserved area of the user area based on a result of comparison between the wear value of the system area and the wear value of the user area. Other examples are shown and described.

20 Claims, 6 Drawing Sheets

<u>100</u>

301
308

411
412
410

401

300

510
Voltage generator 516
512
508
301

Control logic unit
Row decoder/WL driver
Memory array

I/F

514
Register

Page buffer/Sense amplifier
504

Column decoder/BL driver
506

518

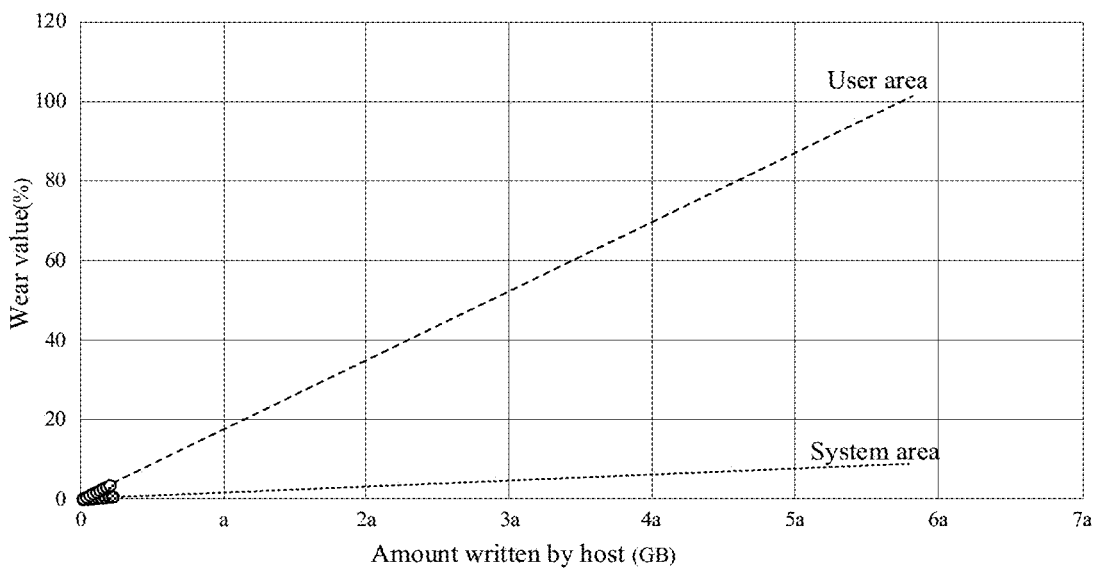

Fig. 6

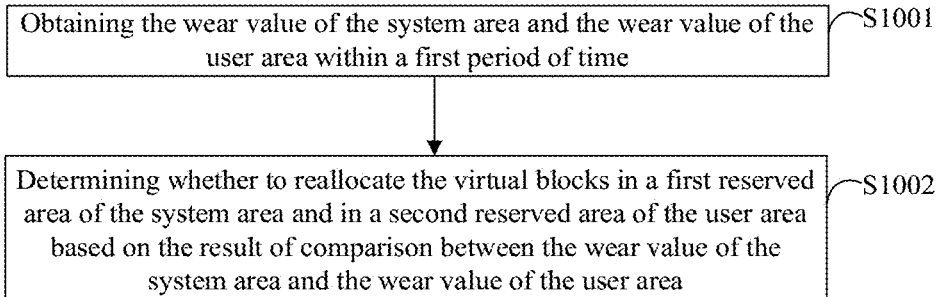

| Obtaining the wear value of the system area and the wear value of the user area within a first period of time | ~S1001 |

| Determining whether to reallocate the virtual blocks in a first reserved area of the system area and in a second reserved area of the user area based on the result of comparison between the wear value of the system area and the wear value of the user area | ~S1002 |

Fig. 7

MEMORY SYSTEMS AND OPERATION METHODS THEREOF TO IMPROVE WEAR LEVELING OF A MEMORY DEVICE

CROSS-REFERENCE TO RELATED APPLICATIONS

This application claims priority to and the benefit of Chinese Patent Application No. 202211440575.6, filed on Nov. 17, 2022, which is hereby incorporated by reference in its entirety.

TECHNICAL FIELD

The present disclosure relates to semiconductor technology, and in particular to memory devices and operation methods thereof, memory systems and an operation methods thereof.

BACKGROUND

A memory device is a memory apparatus used to preserve information in modern information technology. NAND (Not-And) flash memory, as a typical non-volatile semiconductor memory, has become a mainstream products in the memory market due to its high storage density, controllable production cost, suitable programming and erasing speed and retention characteristics.

With the continuous improvement of requirements for memory devices, it is currently one of challenges in the art on how to prolong the service life of memory devices.

BRIEF DESCRIPTION OF THE DRAWINGS

FIG. 6 is a schematic diagram of the relationship between wear values of a system area and a user area and the amount written by a host according to an example of the present disclosure;

FIG. 7 is a schematic diagram of an implementation flow of an operation method for a memory system according to an example of the present disclosure.

DETAILED DESCRIPTION

Figure 1:
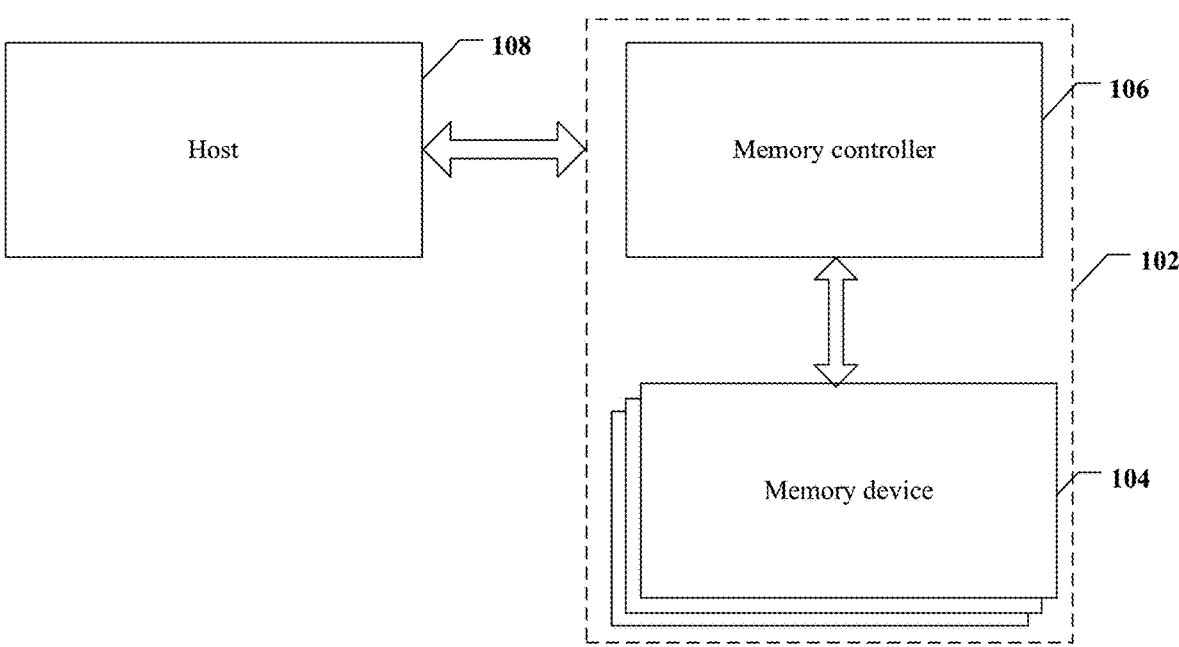
FIG. 1 is a schematic diagram of an example system with a memory system according to an example of the present disclosure.

Example implementations of the present disclosure will be described in more detail below with reference to the accompanying drawings. Although example implementations of the present disclosure are shown in the drawings, it should be understood that the present disclosure may be embodied in various forms and should not be limited to the specific implementations set forth herein. Rather, these implementations are provided so that the present disclosure can be more thoroughly understood and the scope of the present disclosure can be fully conveyed to those skilled in the art.

In the following description, numerous specific details are given in order to provide a more thorough understanding of the present disclosure. It will be apparent, however, to one skilled in the art that the present disclosure may be practiced without one or more of these details. In other instances, some technical features known in the art are not described to avoid confusion with the present disclosure; that is, not all features of the actual example are described here, and well-known functions and structures are not described in detail.

In the drawings, the size of layers, regions, elements and their relative sizes may be exaggerated for clarity. Like reference numerals refer to like elements throughout.

It will be understood that when an element or layer is referred to as being "on," "adjacent to," "connected to" or "coupled to" another element or layer, it can be directly on, adjacent to, connected to, or coupled to other elements or layers, or intervening elements or layers may be present. In contrast, when an element is referred to as being "directly on," "directly adjacent to," "directly connected to" or "directly coupled to" another element or layer, there are no intervening elements or layers present. It will be understood that, although the terms such as first, second, third etc. may be used to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed as a second element, component, region, layer or section without departing from the teachings of the present disclosure. When a second element, component, region, layer or section is discussed, it does not indicate that the present disclosure necessarily presents a first element, component, region, layer or section.

Spatial terms such as "under", "below", "beneath", "underneath", "on", "above" and so on, can be used here for convenience to describe the relationship of one element or feature to other elements or features shown in the figures. It will be understood that the spatially relative terms are intended to encompass different orientations of the device in use and operation in addition to the orientation depicted in the figures. For example, if the device in the figures is turned over, elements or features described as "below" or "under" or "beneath" other elements or features would then be oriented "above" the other elements or features. Thus, the example terms "below" and "beneath" can encompass both orientations of above and below. The device may be otherwise oriented (rotated 90 degrees or at other orientations) and the spatial descriptors used herein may be interpreted accordingly.

The terminology used herein is for the purpose of describing particular examples only and is not to be taken as a limitation of the present disclosure. As used herein, the singular forms "a", "an" and "said/the" are intended to include the plural forms as well, unless the context clearly dictates otherwise. It should also be understood that the terms "consists of" and/or "comprising", when used in this specification, identify the presence of stated features, integers, steps, operations, elements and/or parts, but do not exclude presence or addition of one or more other features, integers, steps, operations, elements, parts and/or groups. As used herein, the term "and/or" includes any and all combinations of the associated listed items.

In order to understand the characteristics and technical content of the examples of the present disclosure in more detail, the implementation of the examples of the present disclosure will be described in detail below in conjunction with the accompanying drawings. The attached drawings are only for reference and description, and are not intended to limit the examples of the present disclosure.

The memory device in the examples of the present disclosure includes but is not limited to a three-dimensional NAND memory, and for ease of understanding, the three-dimensional NAND memory is used as an example for illustration.

FIG. 1 shows a block diagram of an example system 100 with memory devices in accordance with some aspects of the present disclosure. The System 100 may be a mobile phone, desktop computer, laptop computer, tablet computer, vehicle computer, game console, printer, pointing device, wearable electronic device, smart sensor, virtual reality (VR) device, augmented reality (AR) device or any other suitable electronic device having storage therein. As shown in FIG. 1, the system 100 may include a host 108, and a memory system 102 having one or more memory devices 104 and a memory controller 106. The host 108 may be a processor (e.g., a central processing unit (CPU)) or a system on a chip (SoC) (e.g., an application processor (AP)) of an electronic device. Host 108 may be configured to send data to or receive data from the memory devices 104.

According to some implementations, the memory controller 106 is coupled to the memory devices 104 and the host 108 and is configured to control the memory devices 104. The memory controller 106 may manage data stored in the memory devices 104 and communicate with the host 108. In some implementations, the memory controller 106 is designed for operating in low duty-cycle environments such as Secure Digital (SD) cards, Compact Flash (CF) cards, Universal Serial Bus (USB) flash drives, or other media for use in electronic devices such as personal computers, digital cameras, mobile phones, and the like. In some implementations, the memory controller 106 is designed for operation in a high duty-cycle environment SSD or embedded multimedia card (eMMC) used as data storage for mobile devices such as a smartphone, tablet computer, laptop computer, etc., and enterprise memory arrays.

The memory controller 106 may be configured to control operations of the memory devices 104, such as read, erase and program operations. The memory controller 106 may further be configured to manage various functions related to data stored or to be stored in the memory devices 104, including but not limited to bad block management, garbage collection, logical-to-physical address translation, wear leveling, and the like. In some implementations, the memory controller 106 is further configured to process error correction code (ECC) on data read from or written to memory devices 104. Memory controller 106 may further perform any other suitable functions, such as formatting the memory devices 104. Memory controller 106 may communicate with external devices (e.g., host 108) according to a particular communication protocol. For example, the memory controller 106 can communicate with external devices through at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

Figure 2A:
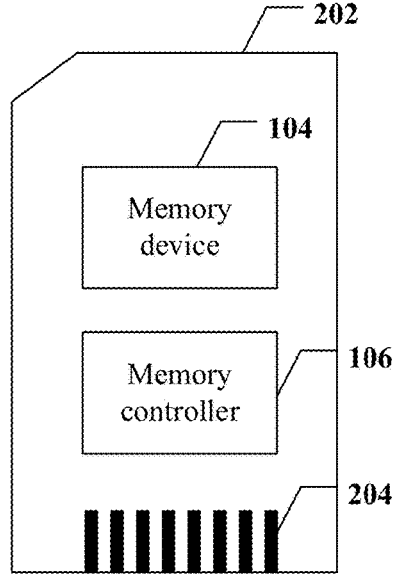
FIG. 2a is a schematic diagram of an example memory card with a memory system according to an example of the present disclosure.
Figure 2B:
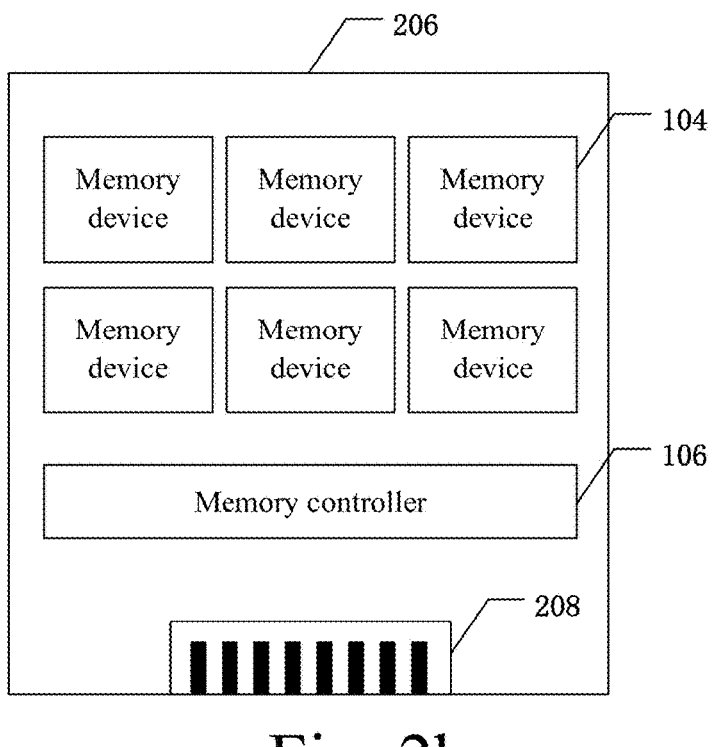
FIG. 2b is a schematic diagram of an example solid state drive with a memory system according to an example of the present disclosure.

The memory controller 106 and the one or more memory devices 104 may be integrated into various types of storage devices, e.g., be included in the same package (e.g., a Universal Flash Storage (UFS) package or an eMMC package). That is, the memory system 102 can be implemented and packaged into different types of end electronic products. In one example as shown in FIG. 2a, the memory controller 106 and a single memory device 104 may be integrated into the memory card 202. The memory card 202 may include a PC card (PCMCIA, Personal Computer Memory Card International Association), CF card, Smart Media (SM) card, memory stick, multimedia card (MMC, RS-MMC, MMC-micro), SD card (SD, miniSD, microSD, SDHC), UFS, etc. The memory card 202 may further include a memory card connector 204 that couples the memory card 202 with a host (e.g., host 108 in FIG. 1). In another example as shown in FIG. 2b, the memory controller 106 and multiple memory devices 104 may be integrated into SSD 206. SSD 206 may further include SSD connector 208 that couples SSD 206 to a host (e.g., host 108 in FIG. 1). In some implementations, the storage capacity and/or operating speed of SSD 206 is greater than the storage capacity and/or operating speed of the memory card 202.

Figure 3A:
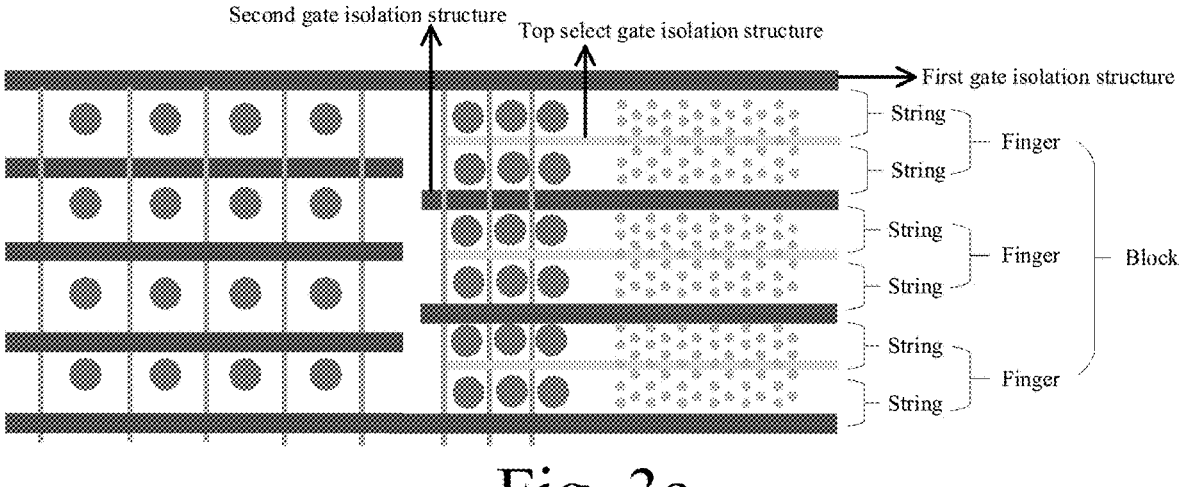
FIG. 3a is a schematic diagram of the distribution of memory cells of a three-dimensional NAND memory according to an example of the present disclosure.

FIG. 3a exemplarily provides a structural schematic diagram of a memory array of a three-dimensional NAND memory. As shown in FIG. 3a, the memory array of the three-dimensional NAND memory consists of several rows of memory cells parallel to gate isolation structure and staggered in parallel. Every four rows of memory cells are separated by a gate isolation structure and a top select gate isolation structure, and each memory cell row includes a plurality of memory cells. The gate isolation structure may include a first gate isolation structure and a second gate isolation structure. The first gate isolation structure divides the memory array into a plurality of blocks, the plurality of second gate isolation structures divides the blocks into multiple fingers, and the top select gate isolation structure set in the middle of each finger can divide the finger into two parts, so that the finger is divided into two strings. A block shown in FIG. 3a includes 6 strings, and in practical applications, the number of strings in a block is not limited to this. The memory cells in a block coupled to a certain word line may be referred to as a memory page or a physical page.

It should be noted that the number of memory cell rows between the gate isolation structure and the top select gate isolation structure shown in FIG. 3a is merely an example, but not to define the number of memory cell rows that one finger of the three-dimensional NAND memory contains in the present disclosure. In practical applications, the number of memory cell rows included in a finger can be adjusted according to actual conditions, such as 2, 4, 8, 16, and so on.

Figure 3B:
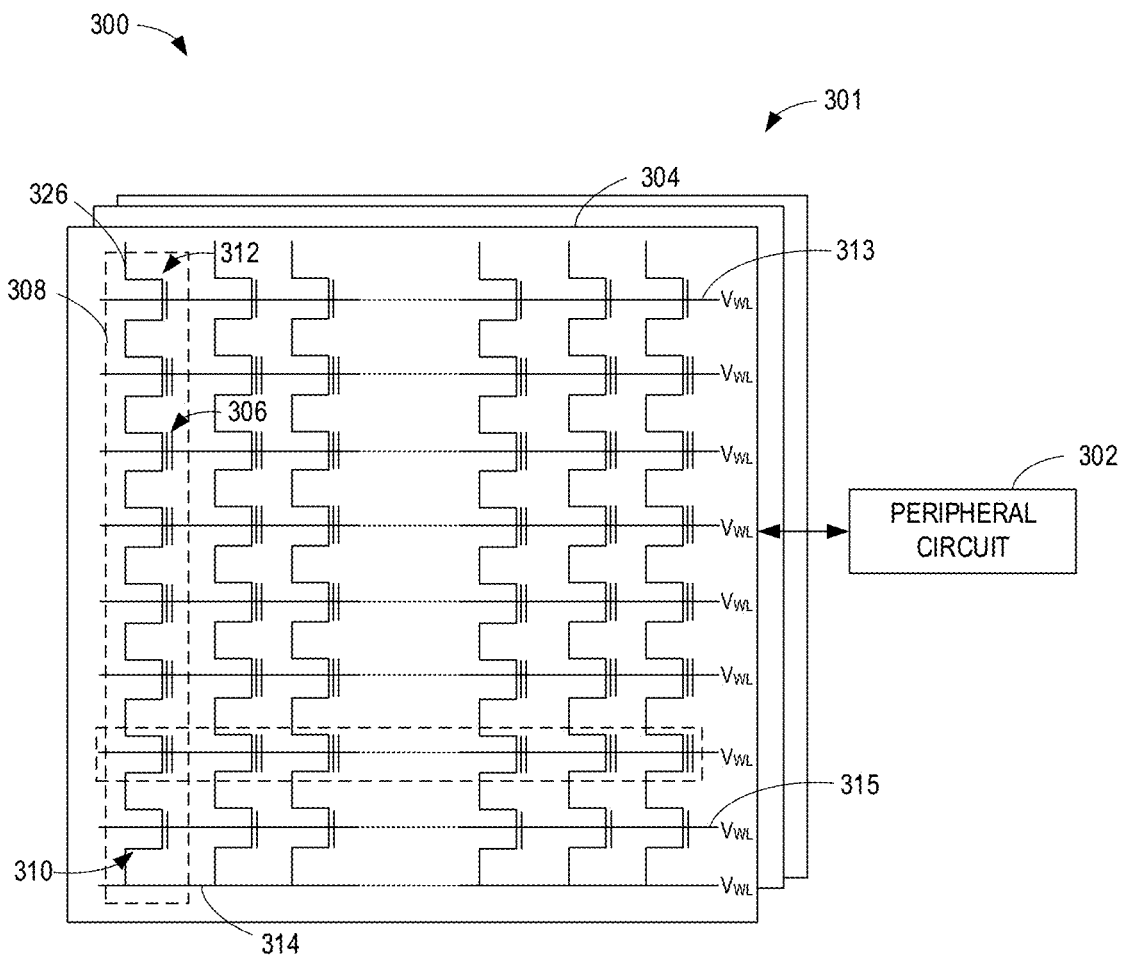
FIG. 3b is a schematic diagram of an example memory device including peripheral circuits according to an example of the present disclosure.

FIG. 3b shows a schematic circuit diagram of an example memory device 300 including peripheral circuits in accordance with some aspects of the present disclosure. Memory device 300 may be an example of memory devices 104 in FIG. 1. Memory device 300 may include a memory array 301 and peripheral circuits 302 coupled to the memory array 301. The memory array 301 is illustrated as an example of a three-dimensional NAND type memory array, where the memory cells 306 are provided in the form of an array of NAND memory strings 308, each NAND memory string 308 extending vertically above a substrate (not shown). In some implementations, each NAND memory string 308 includes a plurality of memory cells 306 coupled in series and stacked vertically. Each memory cell 306 may hold a continuous analog value, such as a voltage or charge, depending on the number of electrons trapped within the area of the memory cell 306. Each memory cell 306 may be a floating-gate memory cell including a floating gate transistor, or a charge-trap memory cell including a charge trap transistor.

In some implementations, each memory cell 306 is a single-level cell (SLC) that has two possible memory states and can thus store one bit of data. For example, a first memory state of "0" may correspond to a first voltage range, and a second memory state of "1" may correspond to a second voltage range. In some implementations, each memory cell 306 is a multi-level cell (MLC) capable of storing more than a single bit of data in more than four memory states. For example, MLCs can store two bits per cell, three bits per cell (also known as triple-level cells (TLC)), or four bits per cell (also known as quad-level cells (QLC)). Each MLC can be programmed to assume a range of possible nominal storage values. In one example, if each MLC stores two bits of data, the MLC can be programmed to take one of the three possible programming levels from the erased state by writing one of three possible nominal storage values into the cell. A fourth nominal storage value may be used for the erased state.

As shown in FIG. 3b, each NAND memory string 308 may include a bottom select gate (BSG) 310 at its source terminal and a top select gate (TSG) 312 at its drain terminal. BSG 310 and TSG 312 may be configured to activate selected NAND memory strings 308 during read and program operations. In some implementations, the sources of the NAND memory strings 308 in the same block 304 are coupled by the same source line (SL) 314 (e.g., a common SL). In other words, according to some examples, all NAND memory strings 308 in the same block 304 have an array common source (ACS). According to some implementations, the TSG 312 of each NAND memory string 308 is coupled to a corresponding bit line (BL) 316 from which data can be read or written via an output bus (not shown). In some implementations, each NAND memory string 308 is configured to be selected or deselected by applying to corresponding TSG 312 a selection voltage (e.g., higher than a threshold voltage of a transistor with TSG 312) or a deselection voltage (for example, 0V) via one or more TSG line 313, and/or, by applying to corresponding BSG 310 a selection voltage (e.g., higher than a threshold voltage of a transistor with BSG 310) or a deselection voltage (for example, 0V) via one or more BSG line 315.

As shown in FIG. 3b, NAND memory strings 308 may be organized into a plurality of blocks 304, each of which may have a common source line 314 (e.g., coupled to ground). In some implementations, each block 304 is the basic unit of data for an erase operation, i.e., all memory cells 306 on the same block 304 are erased simultaneously. To erase the memory cells 306 in a selected block, an erase voltage (Vers) (e.g., a high positive voltage (e.g., 20V or higher)) may be bias coupled to source lines 314 of the selected block and unselected blocks in the same plane as the selected block. It should be understood that, in some examples, erase operations may be performed at the half block level, at the quarter block level, or at the level of any suitable number of blocks or any fraction of blocks. Memory cells 306 of adjacent NAND memory strings 308 may be coupled by word lines 318 that select which row of memory cells 306 is affected by read and program operations. In some implementations, each word line 318 is coupled to a memory page 320 of memory cells 306, memory page 320 is the basic unit of data for programming operations. The size of a memory page 320 in bits may be related to the number of NAND memory strings 308 coupled by word lines 318 in one block 304. Each word line 318 may include a plurality of control gates (gate electrodes) at each memory cell 306 in a corresponding memory page 320 and a gate line coupling the control gates. In combination with FIG. 3a above, a memory page 320 includes a plurality of memory cells 306, the plurality of memory cells are isolated by the top select gate isolation structure and the gate isolation structure, and multiple memory cells between the top select gate isolation structure and the gate isolation structure are arranged into multiple memory cell rows, and each memory cell row is parallel to the gate isolation structure and the top select gate isolation structure. Memory cells in a string where they share the same word line form a programmable (read/write) page.

Figure 4:
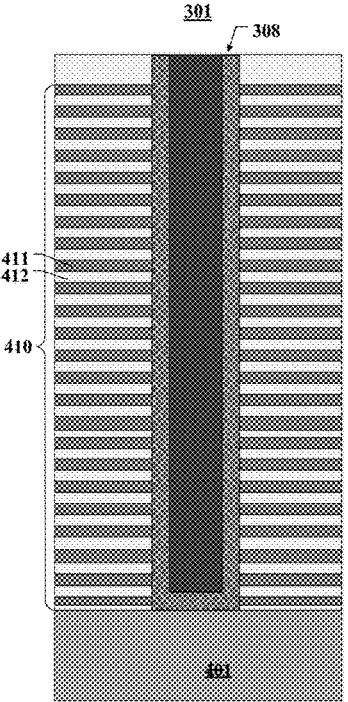
FIG. 4 is a schematic cross-sectional view of a memory array including NAND memory strings according to an example of the present disclosure.

FIG. 4 shows a schematic cross-sectional view of an example memory array 301 including NAND memory strings 308 in accordance with some aspects of the present disclosure. As shown in FIG. 4, the NAND memory string 308 may include a stacked structure 410, which includes a plurality of gate layers 411 and a plurality of insulating layers 412 alternately stacked in sequence, and memory strings 308 vertically penetrating through the gate layers 411 and the insulating layers 412. The gate layers 411 and the insulating layers 412 can be stacked alternately, and two adjacent gate layers 411 are separated by an insulating layer 412. The number of pairs of gate layers 411 and insulating layers 412 in the stacked structure 410 can determine the number of memory cells included in the memory array 301.

A constituent material of the gate layer 411 may include a conductive material. Conductive materials may include, but are not limited to, tungsten (W), cobalt (Co), copper (Cu), aluminum (Al), polysilicon, doped silicon, silicide, or any combination thereof. In some implementations, each gate layer 411 includes a metal layer, e.g., a tungsten layer. In some implementations, each gate layer 411 includes a doped polysilicon layer. Each gate layer 411 may include a control gate surrounding the memory cells. The gate layer 411 at the top of the stacked structure 410 may extend laterally as a top select gate line, the gate layer 411 at the bottom of the stacked structure 410 may extend laterally as a bottom select gate line, and the gate layer 411 extending laterally between the top select gate line and the bottom select gate line may serve as a word line layer.

In some examples, the stacked structure 410 may be disposed on the semiconductor layer 401. The semiconductor layer 401 may include silicon (e.g., monocrystalline silicon), silicon germanium (SiGe), gallium arsenide (GaAs), germanium (Ge), silicon-on-insulator (SOI), germanium-on-insulator (GM), or any other suitable materials.

In some examples, NAND memory strings 308 includes a channel structure extending vertically through stacked structure 410. In some implementations, the channel structure includes a channel hole filled with semiconductor material(s) (e.g., as a semiconductor channel) and dielectric material(s) (e.g., as a memory film). In some implementations, the semiconductor channel includes silicon, e.g., polysilicon. In some implementations, the memory film is a composite dielectric layer including a tunneling layer, a storage layer (also referred to as a "charge trap/storage layer"), and a barrier layer. The channel structure may have a cylindrical shape (e.g., a pillar shape). According to some implementations, the semiconductor channel, the tunneling layer, the storage layer and the barrier layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The barrier layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

Figure 5:
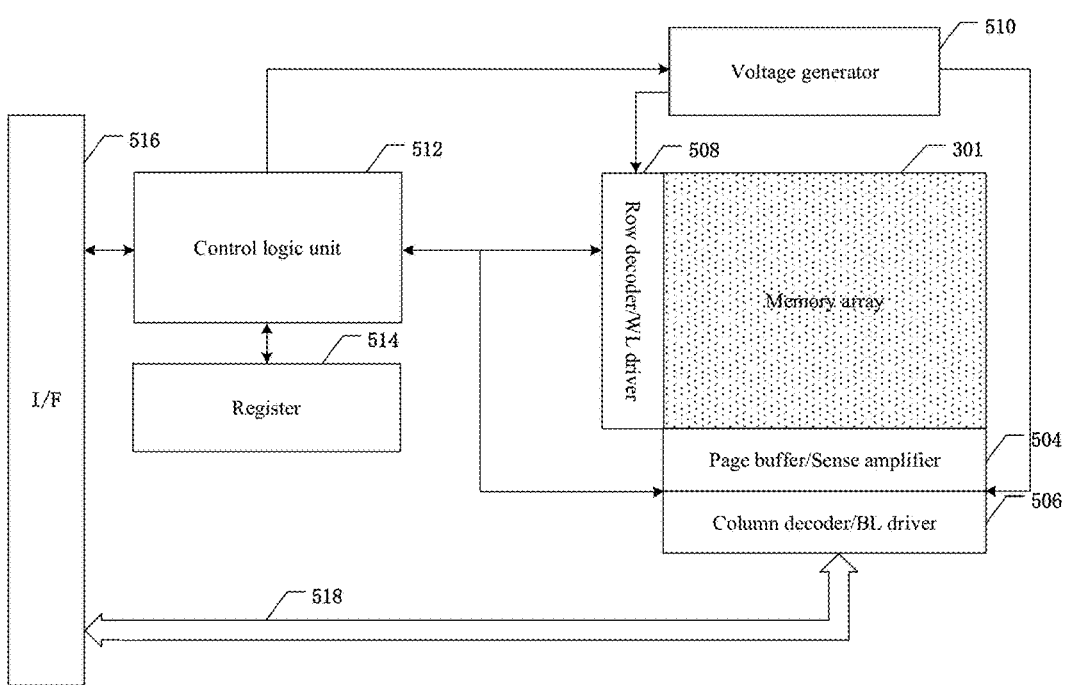
FIG. 5 is a schematic diagram of an example memory device including a memory array and peripheral circuits according to an example of the present disclosure.

Referring back to FIG. 3b, peripheral circuit 302 may be coupled to memory array 301 through bit lines 316, word lines 318, source lines 314, BSG lines 315, and TSG lines 313. Peripheral circuit 302 may include any suitable analog, digital, and mixed-signal circuitry for applying voltage and/or current signals to each target memory cell 306 and sensing voltage signals and/or current signals from each target memory cell 306 via bit lines 316, word lines 318, source lines 314, BSG lines 315, and TSG lines 313, so as to facilitate operation of the memory array 301. Peripheral circuit 302 may include various types of peripheral circuits formed using metal-oxide-semiconductor (MOS) technology. For example, some example peripheral circuits are shown in FIG. 5. Peripheral circuit 302 includes page buffer/sense amplifier 504, column decoder/bit line driver 506, row decoder/word line driver 508, voltage generator 510, control logic unit 512, registers 514, interface 516 and data bus 518. It should be understood that in some examples, additional peripheral circuit not shown in FIG. 5 may further be included.

Page buffer/sense amplifier 504 may be configured to read data from and program (write) data to memory array 301 according to control signals from control logic unit 512. In one example, page buffer/sense amplifier 504 may store a page of program data (write data) to be programmed into one page 320 of memory array 301. In another example, page buffer/sense amplifier 504 may perform a program verify operation to ensure that data has been correctly programmed into memory cells 306 coupled to selected word line 318. In yet another example, page buffer/sense amplifier 504 may further sense a low power signal from bit line 316 representing a data bit stored in memory cells 306 and amplify the small voltage swing to a recognizable logic level during a read operation. Column decoder/bit line driver 506 may be configured to be controlled by control logic unit 512 and to select one or more NAND memory strings 308 by applying bit line voltages generated from voltage generator 510.

Row decoder/word line driver 508 may be configured to be controlled by control logic unit 512 and select/deselect blocks 304 of memory array 301 and select/deselect word lines 318 of blocks 304. Row decoder/word line driver 508 may further be configured to drive word line 318 using a word line voltage generated from voltage generator 510. In some implementations, the row decoder/word line driver 508 can further select/deselect and drive the BSG lines 315 and the TSG lines 313. As described in detail below, the row decoder/word line driver 508 is configured to perform program operations on the memory cells 306 coupled to the selected word line(s) 318. The voltage generator 510 may be configured to be controlled by the control logic unit 512 and generate word line voltages (e.g., read voltages, program voltages, pass voltages, local voltages, verify voltages, etc.), bit line voltages and source line voltage to be supplied to the memory array 301.

Control logic unit 512 may be coupled to each of the peripheral circuits described above and configured to control the operation of each of the peripheral circuits. Registers 514 may be coupled to the control logic unit 512 and include status registers, command registers and address registers for storing status information, command operation codes (OP codes) and command addresses for controlling the operation of each peripheral circuit. Interface 516 may be coupled to control logic unit 512 and act as a control buffer to buffer control commands received from a host (not shown) and relay them to control logic unit 512, and to buffer status information received from control logic unit 512 and relay it to the host. Interface 516 may further be coupled to column decoder/bit line driver 506 via data bus 518 and act as a data I/O interface and data buffer to buffer and relay data to or from memory array 301.

Universal flash storage is a new generation of embedded flash technology that represents both a storage standard and a class of storage devices that use it. Compared with traditional disks, UFS storage devices have the advantages of high performance, low energy consumption, anti-vibration, and small size. They have obvious advantages and are widely used in embedded devices such as mobile phones and tablets.

In some specific examples, a memory device in universal flash storage includes at least one die, each die includes multiple planes, and each plane includes multiple blocks. Due to the large number of blocks in the memory device, managing each block individually will result in increased management complexity and reduced efficiency. Therefore, a collection of multiple blocks located at the same position in planes of the at least one die in the memory device constitutes a virtual block (VB), and the blocks are allocated and used in units of virtual block to reduce the complexity of block management.

The same position here can be understood as follows: if there are multiple dies in the memory device, each die has the same structure, each die includes multiple planes, and the multiple planes have the same structure; it means that the structures of the planes in the memory device are the same, and the same position here may refer to positions with the same physical position seen from the same viewing angle on the basis that each plane is regarded as having the same structure.

The virtual block is divided into a system area and a user area. The system area is generally invisible to users. The size of the system area includes two parts: the required capacity of various system tables and the required capacity of the reserved area of the system area. The system tables store the management data required for the normal operation of the firmware, such as the mapping relationship table from logical address to physical address, the virtual block management table, and the status information of the firmware operation. The user area is an area where the user data transmitted by the host is actually stored. This area can be accessed by users after conversion through the mapping relationship. The size of the user area generally includes two parts: the capacity reported to the host and the capacity of the reserved area of the user area. Due to the characteristics of flash memory, programming is performed in units of memory pages and erasing is performed in units of blocks, existing memory pages cannot be rewritten directly. Therefore, garbage collection is required to move valid data and release empty virtual block. The space reserved for garbage collection, bad block management, wear leveling and other modules to work normally is the reserved area.

Increasing the capacity of the reserved area can improve random programming and writing performance, reduce write amplification and prolong service life of the memory, finally achieving the purpose of increasing terabytes written (TBW). However, the larger the capacity of the reserved area, the smaller the capacity available to users. Therefore, how to select or configure the size of the reserved area is a difficult problem in the firmware algorithm.

Often, the size of the system area is fixedly allocated in advance based on usage scenario estimates or empirical values. The size of the system area determines how much remaining capacity is reserved for the reserved area of the user area. This part of the reserved area reserved for the user area can directly improve the performance of random programming and writing.

Generally, the estimated size of the system area is only to adapt to the mainstream application scenarios of the host, and cannot adapt to some extreme application scenarios. For example, in scenarios such as long-term 4K random writing, the lifespan of the system area will be much longer than that of the data area; in another scenario where sequential writes account for a large proportion, the lifespan of the system area will be much shorter than that of the user area. FIG. 6 shows a schematic diagram of the relationship between the wear values of the system area and the user area and the amount written by the host. It can be seen from FIG. 6 that when the ratio of the value of the total erasure times of the virtual blocks in the user area to the value of an upper limit of total erasable times of the virtual blocks in the user area reaches 100%, that is, when the end of life is reached, the ratio of the value of the total erasure times of the virtual blocks in the system area to the value of an upper limit of total erasable times of the virtual blocks in the system area is less than 10%. Therefore, it has become an challenging issue that needs to be solved at this stage on how to configure the size of the system area and the size of the user area to meet the needs of various application scenarios, so that the system area and the user area can achieve wear leveling, increasing the total amount of written data in the memory system, and prolonging the service life of the memory system.

Based on the above issues, an example of the present disclosure provides an operation method for a memory system, as shown in FIG. 7, which includes:

Step S1001: obtaining the wear value of the system area and the wear value of the user area within a first period of time; and Step S1002: determining whether to reallocate virtual blocks in a first reserved area of the system area and a second reserved area of the user area based on the result of comparison between the wear value of the system area and the wear value of the user area.

It can be understood that in the example of the present disclosure, it is determined whether the virtual blocks in the first reserved area of the system area and the second reserved area of the user area are reallocated based on the result of comparison between the wear value of the system area and the wear value of the user area. That is, the virtual blocks in the first reserved area and the second reserved area in the example of the present disclosure are dynamically adjusted according to specific usage, so that the allocation of the virtual blocks in the system area and the user area is more reasonable. In this way, the memory system can adapt to the needs of various application scenarios. In various application scenarios, the wear value of the system area and the wear value of the user area can maintain a small gap, thereby improving the overall life cycle of the memory system.

In some examples, obtaining the wear value of the system area and the wear value of the user area within the first period of time includes:

obtaining the wear value of the system area and the wear value of the user area within the first period of time when the memory system is in an idle state.

Here, the memory system being in an idle state can be understood as a state when the memory system is not subject to read, write, or erase operations.

In some examples, obtaining the wear value of the system area and the wear value of the user area within the first period of time includes:

obtaining a first ratio and a second ratio within the first period of time, the first ratio is a ratio of the value of the total erasure times of the virtual blocks in the system area to the value of the upper limit of the total erasable times of the virtual blocks in the system area, the second ratio is a ratio of the value of the total erasure times of the virtual blocks in the user area to the value of the upper limit of the total erasable times of the virtual blocks in the user area; or, obtaining the value of the average erasure times of the virtual blocks in the system area and the value of the average erasure times of the virtual blocks in the user area within the first period of time;

determining the wear value of the system area according to the first ratio or the value of the average erasure times of the system area; and determining the wear value of the user area according to the second ratio or the value of the average erasure times of the user area.

Herein, the wear value includes the ratio of the value of the total erasure times of the virtual blocks to the value of the upper limit of the total erasable times of the virtual blocks, or the value of the average erasure times of the virtual blocks and the value of the average erasure times of the virtual blocks. The wear value of the system area can be the ratio of the value of the total erasure times of the virtual blocks in the system area to the value of the upper limit of the total erasable times of the virtual blocks in the system area, or the value of the average erasure times of the virtual blocks in the system area. The wear value of the user area can be the ratio of the value of the total erasure times of the virtual blocks in the user area to the value of the upper limit of the total erasable times of the virtual blocks in the user area, or the value of the average erasure times of the virtual blocks in the user area.

In some examples, obtaining the wear value of the system area and the wear value of the user area within the first period of time includes:

obtaining the wear value of the system area and the wear value of the user area at a first time, and obtaining the wear value of the system area and the wear value of the user area at a second time; and obtaining, as a first difference, the absolute value of the difference between the wear value of the system area at the second time and the wear value of the system area at the first time, and obtaining, as a second difference, the absolute value of the difference between the wear value of the user area at the second time and the wear value of the user area at the first time.

Determining whether to reallocate virtual blocks in the first reserved area of the system area and in the second reserved area of the user area based on the result of comparison between the wear value of the system area and the wear value of the user area, includes:

determining whether to reallocate the virtual blocks in the first reserved area of the system area and the second reserved area of the user area based on the result of comparison between the first difference and the second difference.

In the examples of the present disclosure, the first period of time may be any time period during the use of the memory system, that is, the wear value of the system area and the wear value of the user area within any period of time may be compared, as long as the wear value of the system area and the wear value of the user area within the same period of time are compared.

Here, the start time of the first period of time may be the time when the memory system starts to be used, or any time after the memory system is started to be used. Since the wear value of the system area and the wear value of the user area are both 0 when the memory system starts to be used, when the start time of the first period of time is the time when the memory system starts to be used, the wear value of the system area and the wear value of the user area obtained at a certain time are the wear value of the system area and the wear value of the user area in the first period of time; while when the start time of the first period of time is not the starting point of the memory system starting to use, the wear value of the system area and the wear value of the user area at the start time of the first period of time can be obtained, and the wear value of the system area and the wear value of the user area at the end time of the first period of time, and then the wear values of the system area at the two times are subtracted, and the wear values of the user area at the two times are subtracted, so as to obtain the wear values of the system area and the wear values of the user area within the first period of time.

Herein, one of the first time and the second time may be the start time of the first period of time, and the other of the first time and the second time may be the end time of the first period of time. The first difference is the wear value of the system area in the first period between the first time and the second time, and the second difference is the wear value of the user area in the first period between the first time and the second time. Here, the length of the first period of time may take account for the amount of data written by the host in the first period of time. It can be understood that if the amount of data written by the host is too small in the first period of time, the frequency of the dynamic reserved area adjustment task will be high, which will affect the performance of the memory system.

The following will specifically introduce how to determine whether to reallocate virtual blocks in the first reserved area of the system area and the second reserved area of the user area based on the result of comparison between the wear value of the system area and the wear value of the user area.

In some examples, the first reserved area and the second reserved area are used for at least one of:

Bad block management, garbage collection, and wear leveling.

It is noted that the functions of the first reserved area and the second reserved area listed in the above-mentioned examples are only example, and are not used to limit the functions of the first reserved area and the second reserved area in the examples of the present disclosure.

In some examples, determining whether to reallocate virtual blocks in the first reserved area of the system area and the second reserved area of the user area based on the result of comparison between the wear value of the system area and the wear value of the user area, includes:

when the absolute value of the difference between the wear value of the system area and the wear value of the user area is less than a preset value, not reallocating the virtual blocks in the first reserved area of the system area and the second reserved area of the user area.

It can be understood that, when the absolute value of the difference between the wear value of the system area and the wear value of the user area is less than the preset value, it means that the gap between the wear values of the system area and the user area is small and within an acceptable range, thus it is unnecessary to reallocate the virtual blocks in the first reserved area of the system area and the second reserved area of the user area.

In some examples, determining whether to reallocate virtual blocks in the first reserved area of the system area and the second reserved area of the user area based on the result of comparison between the wear value of the system area and the wear value of the user area, includes:

when the absolute value of the difference between the wear value of the system area and the wear value of the user area is greater than a preset value, reallocating the virtual blocks in the first reserved area of the system area and the second reserved area of the user area.

It can be understood that when the absolute value of the difference between the wear value of the system area and the wear value of the user area is greater than the preset value, it means that the gap between the wear values of the system area and the user area is large, and the virtual blocks in first reserved area of the system area and the second reserved area of the user area need to be reallocated to reduce the gap between the wear value of the system area and the wear value of the user area, so that the absolute value of the difference between the wear value of the system area and the wear value of the user area is smaller than the preset value and the system area and the user area can achieve wear leveling.

In some examples, when the wear value is the ratio of the value of the total erasure times to the value of the upper limit of the total erasable times of the virtual blocks, the preset value ranges from 1% to 10%.

It should be noted that the preset values given above are only example, and are not intended to limit the range of the preset values in the examples of the present disclosure.

For the specific setting of the preset value, two aspects may be considered: on one hand, if the preset value is set too small, the frequency of dynamic adjustment of the virtual blocks will be very high, which will affect the performance of the memory system; on the other hand, if the preset value is set too large, the virtual blocks in the reserved area will not be adjusted in time, which will affect the wear leveling of the system area and the user area. In some specific examples, the magnitude of the preset value can be set in combination with considerations of the above two aspects.

The following detailed description involves how to specifically determine the direction and quantity of allocating virtual blocks when the absolute value of the difference between the wear value of the system area and the wear value of the user area is greater than the preset value.

In some examples, the method further includes:

when the wear value of the system area is greater than the wear value of the user area, allocating part of the virtual blocks of the second reserved area to the first reserved area; and when the wear value of the system area is smaller than the wear value of the user area, allocating part of the virtual blocks of the first reserved area to the second reserved area.

It can be understood that in the examples of the present disclosure, the firmware of the memory system can dynamically adjust the size of the second reserved area in the user area and the size of the first reserved area in the system area within a certain range according to specific application scenarios. When the wear value of the system area is greater than the wear value of the user area, the application scenario is more inclined to wear the system area, so part of the virtual blocks in the second reserved area of the user area are allocated to the first reserved area of the system area, thereby increasing the durability of the system area, and ultimately improving the life cycle of the product and the total amount of written data. When the wear value of the system area is smaller than the wear value of the user area, the application scenario is more inclined to wear the user area, so allocating part of the virtual blocks in the first reserved area of the system area to the second reserved area of the user area can improve random write performance, reduce write amplification and prolong the service life of the memory system, finally enabling the purpose of increasing the total amount of written data.

In some examples, the method further includes:

before reallocating the virtual blocks in the first reserved area of the system area and the second reserved area of the user area, determining the number of virtual blocks that need to be allocated based on the magnitude of the absolute value of the difference between the wear value of the system area and the wear value of the user area.

It can be understood that the number of virtual blocks to be allocated can be determined based on the absolute value of the difference between wear values of the system area and the user area. In other words, the allocated number of virtual blocks may be determined based on the specific extent of the gap between wears of system area and user area. When the absolute value of the difference between the wear value of the system area and the wear value of the user area is larger, the larger the number of allocated virtual blocks; when the absolute value of the difference between the wear value of the system area and the wear value of the user area is smaller, the smaller the number of allocated virtual blocks. This makes it more conducive to the wear leveling of the system area and the user area, and the performance of the memory system is improved.

In some examples, the method further includes:

after determining the number of virtual blocks that need to be allocated, determining that there are free virtual blocks in the reserved area of one of the system area and the user area with a smaller wear value, and the number of free virtual blocks is greater than or equal to the number of virtual blocks that need to be allocated.

Here, a free virtual block refers to a virtual block in an erased state. Here, it is determined that there are free virtual blocks in the reserved area of one of the system area and the user area with a smaller wear value. Specifically, when the wear value of the system area is greater than the wear value of the user area, it is determined that there are free virtual blocks in the second reserved area of the user area; and when the wear value of the user area is greater than the wear value of the system area, it is determined that there are free virtual blocks in the second reserved area of the system area. In addition to determining whether there are free virtual blocks in the reserved area of one of the system area and the user area with a smaller wear value, it is necessary to determine whether the number of free virtual blocks is sufficient. That is, after determining the number and direction of virtual blocks needed to be allocated, it is necessary to determine whether the virtual blocks meet the conditions for allocation, and then perform dynamic allocation tasks on the basis of satisfying the conditions for allocation.

Here, for the specific structure and composition of the memory system, reference may be made to the relevant structure and composition of the memory system 102 in FIG. 1 and FIG. 2a. For the sake of brevity, no more details are given here.

In some specific examples, the memory system includes a memory card or a solid state drive.

When the configuration of the system area and user area with fixed capacity cannot meet the needs of all application scenarios, some algorithms are used in the examples of the present disclosure. When the life wear of the system area and the user area are unbalanced, part of the virtual blocks in the area with a lower lifetime wear moved to the area with higher lifetime wear. Since the virtual blocks in the two areas can flow bidirectional, eventually the wear between the system area and the user area will be balanced, so as to improve the overall life cycle of the memory system. From the perspective of wear leveling, it is equivalent to add a static wear leveling between the system area and the user area; from the perspective of virtual blocks, it is equivalent to that the number of virtual blocks of the user area can be dynamically adjusted according to the workload of the actual application scenario.

In some specific examples, when the memory system leaves the factory, a smaller number of virtual blocks can be allocated to the system area, so that the user area will have more virtual blocks, so as to improve the overall random write performance and reduce write amplification. The wear value of the system area and the wear value of the user area can be checked regularly. If the application scenario tends to consume the system area, the virtual blocks of the second reserved area of the user area are allocated to the system area when the condition is met; and if the application scenario tends to consume the user area, the virtual blocks of the first reserved area of the system area are allocated to the user area when the condition is met.

It can be understood that in the solutions provided by the examples of the present disclosure, an optimal number of virtual blocks are allocated according to application scenarios, which helps to improve the durability and writing performance of flash memory products. For random write and trim intensive application scenarios, more virtual blocks are allocated to the first reserved area of the system area to significantly improve the overall durability of the product; for sequential write and read intensive application scenarios, more virtual blocks are allocated to the user area to also significantly improve product durability.

Figure 8:
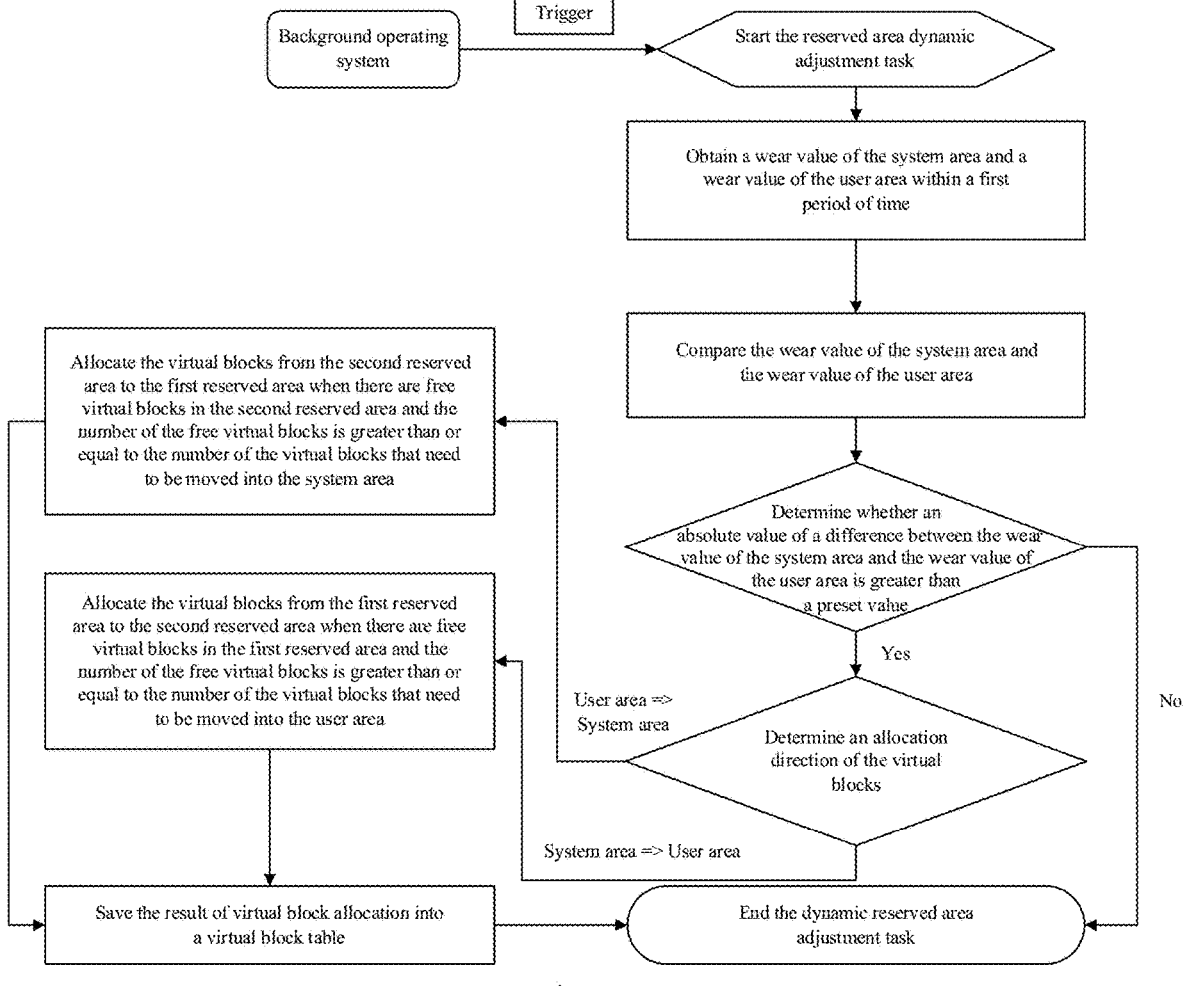
FIG. 8 is a schematic framework diagram of an operation method for a memory system according to an example of the present disclosure.

The technical solutions of the examples of the present disclosure will be further understood in conjunction with FIG. 8 below. First, when the memory system is in an idle state, a background operation (BKOP) will trigger a dynamic reserved area adjustment task. Next, the memory system obtains the wear value of the system area and the wear value of the user area within the first period of time, and compares the wear value of the system area with the wear value of the user area. Next, it is determined whether the absolute value of the difference between the wear value of the system area and the wear value of the user area is greater than a preset value; if it is less than the preset value, the dynamic reserved area adjustment task is ended. Whereas if it is greater than the preset value, the allocation direction of the virtual blocks is determined. If it is necessary to allocate virtual blocks from the system area to the user area, the virtual blocks are allocated from the first reserved area of the system area to the second reserved area of the user area under the conditions that there are free virtual blocks in the first reserved area of the system area, and that the number of the free virtual block is greater than or equal to the number of virtual blocks that need to be moved to the user area. If it is necessary to allocate virtual blocks from the user area to the system area, the virtual block is allocated from the second reserved area of the user area to the first reserved area of the system area, under the conditions that there are free virtual blocks in the second reserved area of the user area, and that the number of free virtual blocks is greater than or equal to the number of the virtual blocks that needs to be moved to the system area. After the allocation of the virtual blocks is completed, the allocation result of the virtual blocks is stored in a virtual block table.

In some specific examples, the examples of the present disclosure may implement multiple methods for detecting improvement effects. First, the number and direction of virtual block allocation are detected, and the correctness of the allocation direction may be determined in combination with other indicators; second, the indicators in the health report is checked through long-term extreme application scenarios, such as the difference between the service life of the system area and the service life of the user area, or the ratio of the average erasure times of the system area to the average erasure times of the user area; third, the change in relationship curve between the wear value of the system area and the wear value of the user area before and after the improvement and the host write time may be compared through a long-term test.

In some examples, each memory cell of the virtual blocks in the system area is read and written with a first number of bits, and each memory cell of the virtual blocks in the user area is read and written with a second number of bits. The first number of bits is less than the second number of bits.

In some specific examples, the first number of bits includes 1 bit, and the second number of bits includes one of: 2 bits, 3 bits, and 4 bits.

Here, each memory cell of the virtual blocks in the system area is read and written with a first number of bits can be understood as that each memory cell of the virtual blocks in the system area can store data of the first number of bits. The first number of bits includes 1 bit. That is, each memory cell of the virtual blocks in the system area is read and written in the form of SLC. It can be understood that performing reading and writing operations in the system area with a low number of bits can increase the data stability of the system area.

Here, each memory cell of the virtual blocks in the user area is read and written with the second number of bits can be understood as that each memory cell of the virtual blocks in the user area can store data of the second number of bits. The second number of bits includes one of: 2 bits, 3 bits, and 4 bits. That is, each memory cell of the virtual blocks in the user area is read and written in MLC, TLC, and QLC modes. It can be understood that performing reading and writing operations in the user area with a high number of bits is beneficial for increasing the capacity of the user area.

It is noted that, the above examples exemplarily list the specific number of bits of the first number of bits and of the second number of bits, but it is not used to limit the specific number of bits of the first number of bits and of the second number of bits in the examples of the present disclosure.

Because the reading and writing modes of the system area and the user area are different, the memory cells of the virtual blocks in the example system area are read and written in the SLC mode, and the memory cells of the virtual blocks in the user area are read and written in the TLC mode. After the virtual blocks are reallocated, the conversion coefficient can be obtained according to the specific test result of the memory device, and then the erasure times of the same virtual block in the two areas can be converted by a conversion formula.

Exemplarily, when the virtual block is allocated from the system area to the user area, the erasure times conversion formula of the virtual block can be written as:

$$ec1 = \frac{slc\ ec}{slc\ \text{life cycle}\ ec} * \alpha1 + \beta1;$$

Where, ec1 is the erasure times in the user area obtained by conversion after the virtual block is allocated to the user area; slc ec is the actual erasure times when the virtual block is read and written in the system area in SLC mode before being allocated; and slc life cycle ec is the value of the upper limit of total erasable times when the virtual block is read and written in SLC mode in the system area. As an example, the slc life cycle ec here can be 65,000. Here, the specific values of $\alpha1$ and $\beta1$ and the following $\alpha2$ and $\beta2$ can be obtained through specific test results of the memory device.

Exemplarily, when the virtual block is allocated from the user area to the system area, the erasure times conversion formula of the virtual block can be written as:

$$ec2 = \frac{tlc\ ec}{tlc\ \text{life cycle}\ ec} * \alpha2 + \beta2;$$

Where, ec2 is the erasure times in the system area obtained by conversion after the virtual block is allocated to the system area; tlc ec is the actual erasure times when the virtual block is read and written in the user area in the TLC mode before being allocated; tlc life cycle ec is the value of the upper limit of total erasable times when the virtual block is read and written in TLC mode in the user area. As an example, the tlc life cycle ec here can be 3000.

An example of the present disclosure provides an operation method for a memory system. The operation method for the memory system includes: obtaining a wear value of a system area and a wear value of a user area within a first period of time; and determining whether to reallocate the virtual blocks in the first reserved area of the system area and the second reserved area of the user area based on the result of comparison between the wear value of the system area and the wear value of the user area. In the example of the present disclosure, the wear value of the system area and the wear value of the user area within the first period of time are obtained, and according to the comparison result of the wear value of the system area and the wear value of the user area, it is determined whether the virtual blocks of the first reserved area of the system area and the second reserved area of the user area are reallocated. That is, in the example of the present disclosure, the sizes of the first reserved area of the system area and the second reserved area of the user area are dynamically adjusted based on usages of the system area and user area, so that the system area and user area in the memory system can adapt to different needs in various scenarios, and a small gap between the wear value of the system area and the wear value of the user area in the memory system can be maintained in various application scenarios. In this way, the system area and the user area can achieve wear leveling, thereby improving the random write performance of the memory system, improving write amplification, improving durability, and increasing the total amount of written data, which makes it possible to extend the lifetime of the memory system.

In the foregoing examples, an operation method for a memory system is introduced, and the execution subject is a memory controller. However, in the solutions provided by the examples of the present disclosure, the execution subject is not limited thereto, and may also be a peripheral circuit in a memory device.

Based on the above operation method for the memory system, an example of the present disclosure further provides an operation method for a memory device, the method including:

obtaining the wear value of the system area and the wear value of the user area within the first period of time; and determining whether to reallocate the virtual blocks in the first reserved area of the system area and the second reserved area of the user area based on the result of comparison between the wear value of the system area and the wear value of the user area.

In some specific examples, the memory device includes at least one die including a memory array and peripheral circuits coupled to the memory array; wherein, The memory array includes multiple planes, and the plane includes multiple blocks; the multiple blocks located at the same position on planes in the at least one die form a virtual block.

In some specific examples, the memory array and the peripheral circuit are disposed on the same chip. In some other specific examples, the memory array is disposed on an array chip, and the peripheral circuit is disposed on a different chip, specifically, chip implemented by using complementary metal oxide semiconductor (CMOS) technology and called CMOS chip. The array chip and the CMOS chip can be electrically coupled together using a bonding process. In some examples, a CMOS chip can be coupled with multiple array chips.

In some specific examples, the memory device includes three-dimensional NAND memory.

However, the memory device in the examples of the present disclosure is not limited to the three-dimensional NAND memory. In the example of the present disclosure, the memory device may be a semiconductor memory, including but not limited to three-dimensional NAND flash memory, vertical NAND flash memory, NOR flash memory, Dynamic Random Access Memory (DRAM), Ferroelectric Random Access Memory (FRAM), Magnetoresistive Random Access Memory (MRAM), Phase Change Random Access Memory (PCRAM), Resistive Random Access Memory (RRAM) or Nano Random Access Memory (NRAM), etc.

Here, the operation method for the memory device provided in the above examples is similar to the operation method for the memory system, and will not be repeated here. For the specific structure and composition of the memory device, reference may be made to the related structure and composition of the peripheral circuit in FIG. 5. For the sake of brevity, no more details are given here.

Based on the above operation method for the memory system, an example of the present disclosure further provides a memory system. The memory system includes a memory device and a memory controller coupled to the memory device. The memory device includes a plurality of virtual blocks, which are divided into a system area and a user area. The system area includes a first reserved area, and the user area includes a second reserved area.

The memory controller is configured to:

obtain the wear value of the system area and the wear value of the user area within the first period of time;

determine whether to reallocate the virtual blocks in the first reserved area of the system area and the second reserved area of the user area based on the result of comparison between the wear value of the system area and the wear value of the user area.

In some examples, the memory controller is configured to:

obtain a first ratio and a second ratio within the first period of time, the first ratio is a ratio of a value of total erasure times of the virtual blocks in the system area to a value of an upper limit of total erasable times of the virtual blocks in the system area, the second ratio is a ratio of a value of total erasure times of the virtual blocks in the user area to a value of an upper limit of total erasable times of the virtual blocks in the user area; or obtain a value of average erasure times of the virtual blocks in the system area and a value of average erasure times of the virtual blocks in the user area within the first period of time; and determine the wear value of the system area based on the first ratio or the value of the average erasure times of the system area; and determine the wear value of the user area based on the second ratio or the value of the average erasure times of the user area.

In some examples, the memory controller is configured to:

when the absolute value of the difference between the wear value of the system area and the wear value of the user area is greater than a preset value, reallocate the virtual blocks in the first reserved area of the system area and the second reserved area of the user area.

In some examples, the memory controller is configured to:

when the absolute value of the difference between the wear value of the system area and the wear value of the user area is less than a preset value, not reallocate the virtual blocks in the first reserved area of the system area and the second reserved area of the user area.

In some examples, when the wear value is the ratio of the value of the total erasure times to the value of the upper limit of the total erasable times of the virtual blocks, the preset value ranges from 1% to 10%.

In some examples, the memory controller is configured to:

when the wear value of the system area is greater than the wear value of the user area, allocate part of the virtual blocks in the second reserved area to the first reserved area; and when the wear value of the system area is smaller than the wear value of the user area, allocate part of the virtual blocks in the first reserved area to the second reserved area.

In some examples, the memory controller is configured to:

before reallocating the virtual blocks in the first reserved area of the system area and the second reserved area of the user area, determine the number of virtual blocks that need to be allocated based on the magnitude of the absolute value of the difference between the wear value of the system area and the wear value of the user area.

In some examples, the memory controller is configured to:

after determining the number of virtual blocks that need to be allocated, determine that there are free virtual blocks in the reserved area of one of the system area and the user area with a smaller wear value, and the number of the free virtual blocks is greater than or equal to the number of the virtual blocks that need to be allocated.

In some examples, the first reserved area and the second reserved area are used for at least one of:

bad block management, garbage collection, and wear leveling.

In some examples, the memory controller is configured to:

when the memory system is in an idle state, obtain a wear value of the system area and a wear value of the user area within a first period of time.

In some examples, the memory controller is configured to:

obtain the wear value of the system area and the wear value of the user area at a first time, and obtain the wear value of the system area and the wear value of the user area at a second time;

obtain, as a first difference, the absolute value of the difference between the wear value of the system area at the second time and the wear value of the system area at the first time, and obtain, as a second difference, the absolute value of the difference between the wear value of the user area at the second time and the wear value of the user area at the first time;

determine whether to reallocate the virtual blocks in the first reserved area of the system area and the second reserved area of the user area based on the result of comparison between the first difference and the second difference.

In some examples, each memory cell of the virtual blocks in the system area is read and written with a first number of bits, and each memory cell of the virtual blocks in the user area is read and written with a second number of bits. The first number of bits is less than the second number of bits.

In some examples, the memory system includes a memory card or a solid state drive.

An example of the present disclosure further provides another memory system, the memory system includes a memory device, the memory device includes a plurality of virtual blocks, and the plurality of virtual blocks are divided into a system area and a user area. The system area includes a first reserved area, and the user area includes a second reserved area.

The absolute value of the difference between the wear value of the system area and the wear value of the user area is less than a preset value.

In some examples, the wear value comprises a ratio of a value of total erasure times of the virtual blocks to a value of an upper limit of total erasable times of the virtual blocks, or a value of average erasure times of the virtual blocks.

It can be understood that in the examples of the present disclosure, the reserved area dynamic adjustment task is employed, so that the absolute value of the difference between the wear value of the system area and the wear value of the user area is smaller than the preset value, that is, a small gap between the wear value of the system area and the wear value of the user area may be maintained. In this way, the system area and the user area can achieve wear leveling, so that the service life of the memory system can be extended.

In some examples, when the wear value is the ratio of the value of the total erasure times to the value of the upper limit of the total erasable times of the virtual blocks, the preset value ranges from 1% to 10%.

In some examples, the first reserved area and the second reserved area are used for at least one of:

bad block management, garbage collection, and wear leveling.

Here, the memory system provided in the foregoing examples has been described in detail on the corresponding method, and details are not repeated here.

Based on the above operation method for the memory device, an example of the present disclosure further provides a memory device, the memory device includes a memory array and a peripheral circuit coupled to the memory array; the memory device includes multiple virtual blocks, the multiple virtual blocks are divided into a system area and a user area, the system area includes a first reserved area, and the user area includes a second reserved area;

The peripheral circuit is configured to:

obtain the wear value of the system area and the wear value of the user area within the first period of time; and determine whether to reallocate the virtual blocks in the first reserved area of the system area and the second reserved area of the user area based on the result of comparison between the wear value of the system area and the wear value of the user area.

In some examples, the memory device includes three-dimensional NAND memory.

According to a first aspect of an example of the present disclosure, there is provided a memory system, the memory system includes a memory device and a memory controller coupled to the memory device; the memory device includes a plurality of virtual blocks, the plurality of virtual blocks are divided into a system area and a user area, the system area includes a first reserved area, and the user area includes a second reserved area;

the memory controller is configured to:

obtain a wear value of the system area and a wear value of the user area within a first period of time; and determine whether to reallocate the virtual blocks in the first reserved area of the system area and the second reserved area of the user area based on a result of comparison between the wear value of the system area and the wear value of the user area.

In the above solution, the memory controller is configured to:

obtain a first ratio and a second ratio within the first period of time, the first ratio is a ratio of a value of total erasure times of the virtual blocks in the system area to a value of an upper limit of total erasable times of the virtual blocks in the system area, the second ratio is a ratio of a value of total erasure times of the virtual blocks in the user area to a value of an upper limit of total erasable times of the virtual blocks in the user area; or obtain a value of average erasure times of the virtual blocks in the system area and a value of average erasure times of the virtual blocks in the user area within the first period of time; and determine the wear value of the system area based on the first ratio or the value of the average erasure times of the system area; and determine the wear value of the user area based on the second ratio or the value of the average erasure times of the user area.

In the above solution, the memory controller is configured to:

when an absolute value of a difference between the wear value of the system area and the wear value of the user area is greater than a preset value, reallocate the virtual blocks in the first reserved area of the system area and the second reserved area of the user area.

In the above solution, the memory controller is configured to:

when an absolute value of a difference between the wear value of the system area and the wear value of the user area is less than a preset value, not reallocate the virtual blocks in the first reserved area of the system area and the second reserved area of the user area.

In the above solution, when the wear value is the ratio of the value of the total erasure times to the value of the upper limit of the total erasable times of the virtual blocks, the preset value ranges from 1% to 10%.

In the above solution, the memory controller is configured to:

when the wear value of the system area is greater than the wear value of the user area, allocate part of the virtual blocks in the second reserved area to the first reserved area; and when the wear value of the system area is smaller than the wear value of the user area, allocate part of the virtual blocks in the first reserved area to the second reserved area.

In the above solution, the memory controller is configured to:

before reallocating the virtual blocks in the first reserved area of the system area and the second reserved area of the user area, determine the number of virtual blocks that need to be allocated based on a magnitude of the absolute value of the difference between the wear value of the system area and the wear value of the user area.

In the above solution, the memory controller is configured to:

after determining the number of virtual blocks that need to be allocated, determine that there are free virtual blocks in the reserved area of one of the system area and the user area with a smaller wear value, and the number of the free virtual blocks is greater than or equal to the number of the virtual blocks that need to be allocated.

In the above solution, the first reserved area and the second reserved area are used for at least one of:

bad block management, garbage collection, and wear leveling.

In the above solution, the memory controller is configured to:

when the memory system is in an idle state, obtain the wear value of the system area and the wear value of the user area within the first period of time.

In the above solution, the memory controller is configured to:

obtain the wear value of the system area and the wear value of the user area at a first time, and obtain the wear value of the system area and the wear value of the user area at a second time;

obtain, as a first difference, an absolute value of a difference between the wear value of the system area at the second time and the wear value of the system area at the first time, and obtain, as a second difference, an absolute value of a difference between the wear value of the user area at the second time and the wear value of the user area at the first time; and determine whether to reallocate the virtual blocks in the first reserved area of the system area and the second reserved area of the user area based on a result of comparison between the first difference and the second difference.

In the above solution, each memory cell of the virtual blocks in the system area is read and written with a first number of bits, and each memory cell of the virtual blocks in the user area is read and written with a second number of bits, the first number of bits being less than the second number of bits.

In the above solution, the memory system includes a memory card or a solid state drive.

According to a second aspect of an example of the present disclosure, another memory system is provided, including a memory device, the memory device includes a plurality of virtual blocks, the plurality of virtual blocks are divided into a system area and a user area, the system area includes a first reserved area, and the user area includes a second reserved area; and an absolute value of a difference between a wear value of the system area and a wear value of the user area is less than a preset value.

In the above solution, the wear value comprises a ratio of a value of total erasure times of the virtual blocks to a value of an upper limit of total erasable times of the virtual blocks, or a value of average erasure times of the virtual blocks.

In the above solution, when the wear value is the ratio of the value of the total erasure times to the value of the upper limit of the total erasable times of the virtual blocks, the preset value ranges from 1% to 10%.

In the above solution, the first reserved area and the second reserved area are used for at least one of:

bad block management, garbage collection, and wear leveling.

According to a third aspect of the examples of the present disclosure, a memory device is provided, including a memory array and a peripheral circuit coupled to the memory array; the memory device includes a plurality of virtual blocks, the plurality of virtual blocks are divided into a system area and a user area, the system area includes a first reserved area, and the user area includes a second reserved area;

the peripheral circuit is configured to:

obtain a wear value of the system area and a wear value of the user area within a first period of time; and determine whether to reallocate the virtual blocks in the first reserved area of the system area and the second reserved area of the user area based on a result of comparison between the wear value of the system area and the wear value of the user area.

According to a fourth aspect of an example of the present disclosure, there is provided an operation method for a memory system, including:

obtaining a wear value of a system area and a wear value of a user area within a first period of time; and determining whether to reallocate virtual blocks in a first reserved area of the system area and a second reserved area of the user area based on a result of comparison between the wear value of the system area and the wear value of the user area.

In the above solution, obtaining the wear value of the system area and the wear value of the user area within the first period of time, includes:

obtain a first ratio and a second ratio within the first period of time, the first ratio is a ratio of a value of total erasure times of the virtual blocks in the system area to a value of an upper limit of total erasable times of the virtual blocks in the system area, the second ratio is a ratio of a value of total erasure times of the virtual blocks in the user area to a value of an upper limit of total erasable times of the virtual blocks in the user area; or obtain a value of average erasure times of the virtual blocks in the system area and a value of average erasure times of the virtual blocks in the user area within the first period of time; and determining the wear value of the system area based on the first ratio or the value of the average erasure times of the system area; and determining the wear value of the user area based on the second ratio or the value of the average erasure times of the user area.

In the above solution, determining whether to reallocate virtual blocks in the first reserved area of the system area and the second reserved area of the user area based on the result of comparison between the wear value of the system area and the wear value of the user area, includes:

when an absolute value of a difference between the wear value of the system area and the wear value of the user area is greater than a preset value, reallocating the virtual blocks in the first reserved area of the system area and the second reserved area of the user area.

In the above solution, determining whether to reallocate virtual blocks in the first reserved area of the system area and the second reserved area of the user area based on the result of comparison between the wear value of the system area and the wear value of the user area, includes:

when an absolute value of a difference between the wear value of the system area and the wear value of the user area is less than a preset value, not reallocating the virtual blocks in the first reserved area of the system area and the second reserved area of the user area.

In the above solution, when the wear value is the ratio of the value of the total erasure times to the value of the upper limit of the total erasable times of the virtual blocks, the preset value ranges from 1% to 10%.

In the above scheme, the method further includes:

when the wear value of the system area is greater than the wear value of the user area, allocating part of the virtual blocks in the second reserved area to the first reserved area; and when the wear value of the system area is smaller than the wear value of the user area, allocating part of the virtual blocks in the first reserved area to the second reserved area.

In the above scheme, the method further includes:

before reallocating the virtual blocks in the first reserved area of the system area and the second reserved area of the user area, determining the number of virtual blocks that need to be allocated based on a magnitude of the absolute value of the difference between the wear value of the system area and the wear value of the user area.

In the above scheme, the method further includes:

after determining the number of virtual blocks that need to be allocated, determining that there are free virtual blocks in the reserved area of one of the system area and the user area with a smaller wear value, and the number of the free virtual blocks is greater than or equal to the number of the virtual blocks that need to be allocated.

In the above solution, the first reserved area and the second reserved area are used for at least one of:

bad block management, garbage collection, and wear leveling.

In the above solution, obtaining the wear value of the system area and the wear value of the user area within the first period of time, includes:

when the memory system is in an idle state, obtaining the wear value of the system area and the wear value of the user area within the first period of time.

In the above solution, obtaining the wear value of the system area and the wear value of the user area within the first period of time, includes:

obtaining the wear value of the system area and the wear value of the user area at a first time, and obtaining the wear value of the system area and the wear value of the user area at a second time;

obtaining, as a first difference, an absolute value of a difference between the wear value of the system area at the second time and the wear value of the system area at the first time, and obtaining, as a second difference, an absolute value of a difference between the wear value of the user area at the second time and the wear value of the user area at the first time; and determining whether to reallocate virtual blocks in the first reserved area of the system area and the second reserved area of the user area based on the result of comparison between the wear value of the system area and the wear value of the user area, includes:

determining whether to reallocate the virtual blocks in the first reserved area of the system area and the second reserved area of the user area based on a result of comparison between the first difference and the second difference.

In the above solution, each memory cell of the virtual blocks in the system area is read and written with a first number of bits, and each memory cell of the virtual blocks in the user area is read and written with a second number of bits, the first number of bits being less than the second number of bits.

According to a fifth aspect of an example of the present disclosure, there is provided an operation method for a memory device, including:

obtaining a wear value of a system area and a wear value of a user area within a first period of time; and determining whether to reallocate virtual blocks in a first reserved area of the system area and a second reserved area of the user area based on a result of comparison between the wear value of the system area and the wear value of the user area.

Examples of the present disclosure provide a memory device and operation method thereof, a memory system and operation method thereof. The operation method for the memory system includes: obtaining a wear value of a system area and a wear value of a user area within a first period of time; and determining whether to reallocate the virtual blocks in the first reserved area of the system area and the second reserved area of the user area based on the result of comparison between the wear value of the system area and the wear value of the user area. In the example of the present disclosure, the wear value of the system area and the wear value of the user area within the first period of time are obtained, and based on the result of comparison between the wear value of the system area and the wear value of the user area, it is determined whether the virtual blocks of the first reserved area of the system area and the second reserved area of the user area are reallocated. That is, in the example of the present disclosure, the sizes of the first reserved area of the system area and the second reserved area of the user area are dynamically adjusted based on specific usages of the system area and user area, so that the system area and user area in the memory system can adapt to different needs in various scenarios, and a small gap between the wear value of the system area and the wear value of the user area in the memory system can be maintained in various application scenarios. In this way, the system area and the user area can achieve wear leveling, thereby improving the random write performance of the memory system, improving write amplification, improving durability, and increasing the total amount of written data, which makes it possible to extend the lifetime of the memory system.

It should be understood that reference throughout the specification to "one example" or "an example" means that a particular feature, structure or characteristic related to the example is included in at least one example of the present disclosure. Thus, appearances of "in one example" or "in an example" in various places throughout the specification are not necessarily referring to the same example. Furthermore, the particular features, structures or characteristics may be combined in any suitable manner in one or more examples. It should be understood that in various examples of the present disclosure, the sequence numbers of the above-mentioned processes do not mean the order of execution, and the execution order of the processes should be determined by their functions and inherent logic, rather than limiting implementation process of the examples of the present disclosure. The serial numbers of the above-mentioned examples of the present disclosure are for description only, and do not represent the advantages and disadvantages of the examples.

The methods disclosed in the several method examples provided in the present disclosure can be combined arbitrarily to obtain new method examples if there is no conflict.

The above is only a specific implementation of the present disclosure, but the scope of protection of the present disclosure is not limited thereto. Anyone skilled in the art can easily conceive of changes or substitutions within the technical scope of the present disclosure, which should fall within the protection scope of the present disclosure. Therefore, the protection scope of the present disclosure should be determined by the protection scope of the claims.

What is claimed is:

1. A memory system comprising:
a memory device; and
a memory controller coupled to the memory device, the memory device including a plurality of virtual blocks, the plurality of virtual blocks divided into a system area including first virtual blocks and a user area including second virtual blocks, the system area including a first reserved area, and the user area including a second reserved area, wherein the memory controller is configured to at least:
obtain a wear value of the system area and a wear value of the user area within a first period of time;
determine whether to reallocate a number of the first virtual blocks in the first reserved area or a number of the second virtual blocks in the second reserved area based on a result of a comparison between the wear value of the system area and the wear value of the user area;
determine a first wear value of a first number of free virtual blocks in the first reserved area and a second wear value of a second number of free virtual blocks in the second reserved area, wherein the first reserved area includes the first number of free virtual blocks and the first virtual blocks, and wherein the second reserved area includes the second number of free virtual blocks and the second virtual blocks; and
when an absolute value of a difference between the wear value of the system area and the wear value of the user area is greater than a threshold corresponding to wear of the memory system, transfer the number of the first virtual blocks from the first reserved area to the second reserved area to reduce the difference below the threshold, wherein the second number of free virtual blocks in the second reserved area has a smaller wear value than the system area and the second number of free virtual blocks in the second reserved area is greater than or equal to the number of the first virtual blocks that are reallocated.

2. The memory system of claim 1, wherein the memory controller is configured to at least:
obtain a first ratio and a second ratio within the first period of time, the first ratio is a ratio of a value of total erasure times of the first virtual blocks in the system area to a value of an upper limit of total erasable times of the first virtual blocks in the system area, the second ratio is a ratio of a value of total erasure times of the second virtual blocks in the user area to a value of an upper limit of total erasable times of the second virtual blocks in the user area; or
obtain a value of average erasure times of the first virtual blocks in the system area and a value of average erasure times of the second virtual blocks in the user area within the first period of time;
determine the wear value of the system area based on the first ratio or the value of the average erasure times of the system area; and
determine the wear value of the user area based on the second ratio or the value of the average erasure times of the user area.

3. The memory system of claim 1, wherein the memory controller is configured to at least determine the threshold, wherein a magnitude of the threshold is based on a frequency of dynamic adjustment of the number of the first virtual blocks in the first reserved area and the number of the second virtual blocks in the second reserved area.

4. The memory system of claim 1, wherein the memory controller is configured to at least, when the absolute value of the difference between the wear value of the system area and the wear value of the user area is less than the threshold, not cause the transfer of the number of the first virtual blocks in the first reserved area or the number of the second virtual blocks in the second reserved area.

5. The memory system of claim 1, wherein the wear value is a ratio of a value of total erasure times to the value of an upper limit of total erasable times of the plurality of virtual blocks, and the threshold ranges from 1% to 10%.

6. The memory system of claim 1, wherein the memory controller is configured to at least:
when the wear value of the system area is greater than the wear value of the user area, allocate a first part of the number of the second virtual blocks in the second reserved area to the number of the first virtual blocks in the first reserved area; and
when the wear value of the system area is smaller than the wear value of the user area, allocate a second part of the number of the first virtual blocks in the first reserved area to the number of the second virtual blocks in the second reserved area.

7. The memory system of claim 6, wherein the memory controller is configured to at least, before reallocating the number of the first virtual blocks in the first reserved area or the number of the second virtual blocks in the second reserved area, determine a number of the plurality of virtual blocks that need to be allocated based on a magnitude of the absolute value of the difference between the wear value of the system area and the wear value of the user area.

8. The memory system of claim 7, wherein the memory controller is configured to at least, after determining the number of the plurality of virtual blocks that need to be allocated, determine that there are a number of free virtual blocks in the reserved area of one of the system area and the user area with the smaller wear value, and the number of the free virtual blocks is greater than or equal to the number of the plurality of virtual blocks that need to be allocated.

9. The memory system of claim 1, wherein the first reserved area and the second reserved area are used for at least one of bad block management, garbage collection, or wear leveling.

10. The memory system of claim 1, wherein the memory controller is configured to at least, when the memory system is in an idle state, obtain the wear value of the system area and the wear value of the user area within the first period of time.

11. The memory system of claim 1, wherein the memory controller is configured to at least:

obtain the wear value of the system area and the wear value of the user area at a first time, and obtain the wear value of the system area and the wear value of the user area at a second time;

obtain, as a first difference, the absolute value of the difference between the wear value of the system area at the second time and the wear value of the system area at the first time, and obtain, as a second difference, the absolute value of the difference between the wear value of the user area at the second time and the wear value of the user area at the first time; and determine whether to reallocate the number of the first virtual blocks in the first reserved area or the number of the second virtual blocks in the second reserved area based on a result of a comparison between the first difference and the second difference.

12. The memory system of claim 1, wherein each memory cell of the first virtual blocks in the system area is read and written with a first number of bits, and each memory cell of the second virtual blocks in the user area is read and written with a second number of bits, the first number of bits being less than the second number of bits.

13. The memory system of claim 1, wherein the memory system comprises a memory card or a solid state drive.

14. A memory system comprising a memory device, the memory device comprises a plurality of virtual blocks, the plurality of virtual blocks are divided into a system area including first virtual blocks and a user area including second virtual blocks, the system area comprises a first reserved area, and the user area comprises a second reserved area; and an absolute value of a difference between a wear value of the system area and a wear value of the user area is greater than a threshold corresponding to wear of the memory system, wherein, to reduce the difference to less than the threshold, a memory controller is configured to transfer a number of the first virtual blocks from the first reserved area to the second reserved area to reduce the difference to less than the threshold, wherein a first wear value of a first number of free virtual blocks in the first reserved area is larger than a second wear value of a second number of free virtual blocks in the second reserved area, wherein the first reserved area includes the first number of free virtual blocks and the first virtual blocks, and the second reserved area includes the second number of free virtual blocks and the second virtual blocks, and wherein the second number of free virtual blocks in the second reserved area is greater than or equal to the number of the first virtual blocks that are reallocated.

15. The memory system of claim 14, wherein the wear value comprises a ratio of a value of total erasure times of the plurality of virtual blocks to a value of an upper limit of total erasable times of the plurality of virtual blocks, or a value of average erasure times of the plurality of virtual blocks.

16. The memory system of claim 15, wherein the wear value is the ratio of the value of the total erasure times to the value of the upper limit of the total erasable times of the plurality of virtual blocks, and the threshold ranges from 1% to 10%.

17. The memory system of claim 14, wherein the first reserved area and the second reserved area are used for at least one of bad block management, garbage collection, or wear leveling.

18. An operation method for a memory system, the method comprising:

obtaining a wear value of a system area and a wear value of a user area within a first period of time;

determining whether to reallocate a number of first virtual blocks in a first reserved area or a number of second virtual blocks in a second reserved area based on a result of a comparison between the wear value of the system area and the wear value of the user area;

determining a first wear value of a first number of free virtual blocks in the first reserved area and a second wear value of a second number of free virtual blocks in the second reserved area, wherein the first reserved area includes the first number of free virtual blocks and the first virtual blocks, and wherein the second reserved area includes the second number of free virtual blocks and the second virtual blocks; and when an absolute value of a difference between the wear value of the system area and the wear value of the user area is greater than a threshold corresponding to wear of the memory system, transfer the number of the first virtual blocks from the first reserved area to the second reserved area to reduce the difference below the threshold, wherein the second number of free virtual blocks in the second reserved area has a smaller wear value than the system area and the second number of free virtual blocks in the second reserved area is greater than or equal to the number of the first virtual blocks that are reallocated.

19. The method of claim 18, wherein obtaining the wear value of the system area and the wear value of the user area within the first period of time, comprises:

obtaining a first ratio and a second ratio within the first period of time, the first ratio is a ratio of a value of total erasure times of the first virtual blocks in the system area to a value of an upper limit of total erasable times of the first virtual blocks in the system area, the second ratio is a ratio of a value of total erasure times of the second virtual blocks in the user area to a value of an upper limit of total erasable times of the second virtual blocks in the user area; or obtaining a value of average erasure times of the first virtual blocks in the system area and a value of average erasure times of the second virtual blocks in the user area within the first period of time;

determining the wear value of the system area based on the first ratio or the value of the average erasure times of the system area; and determining the wear value of the user area based on the second ratio or the value of the average erasure times of the user area.

20. The method of claim 18, further comprising determining the threshold, wherein a magnitude of the threshold is based on a frequency of dynamic adjustment of the number of the first virtual blocks in the first reserved area and the number of the second virtual blocks in the second reserved area.

* * * * *